United States Patent
Tsien et al.

(10) Patent No.: US 12,411,538 B2
(45) Date of Patent: *Sep. 9, 2025

(54) SYSTEM-WIDE LOW POWER MANAGEMENT

(71) Applicant: Advanced Micro Devices, Inc., Santa Clara, CA (US)

(72) Inventors: Benjamin Tsien, Santa Clara, CA (US); Greggory D. Donley, Santa Clara, CA (US); Bryan P. Broussard, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/366,423

(22) Filed: Jul. 2, 2021

(65) Prior Publication Data

US 2021/0333860 A1    Oct. 28, 2021

Related U.S. Application Data

(63) Continuation of application No. 15/856,546, filed on Dec. 28, 2017, now Pat. No. 11,054,887.

(51) Int. Cl.
*G06F 1/32* (2019.01)
*G06F 1/3209* (2019.01)
(Continued)

(52) U.S. Cl.
CPC .......... *G06F 1/3287* (2013.01); *G06F 1/3209* (2013.01); *G06F 1/3234* (2013.01); *G06F 1/3296* (2013.01); *G06F 9/5094* (2013.01)

(58) Field of Classification Search
None
See application file for complete search history.

(56) References Cited

U.S. PATENT DOCUMENTS

| | | | |
|---|---|---|---|
| 4,980,836 | A | 12/1990 | Carter et al. |
| 5,396,635 | A | 3/1995 | Fung |

(Continued)

FOREIGN PATENT DOCUMENTS

| | | |
|---|---|---|
| JP | 2005508041 A | 3/2005 |
| KR | 1020100041829 | 4/2010 |
| KR | 1020100080409 | 8/2010 |

OTHER PUBLICATIONS

First Examination Report in Indian Patent Application No. 202017031107, mailed Apr. 11, 2022, 7 pages.

(Continued)

*Primary Examiner* — Fahmida Rahman

(74) *Attorney, Agent, or Firm* — Kowert, Hood, Munyon, Rankin & Goetzel, P.C.; Rory D. Rankin

(57) ABSTRACT

Systems, apparatuses, and methods for performing efficient power management for a multi-node computing system are disclosed. A computing system includes multiple nodes. When power down negotiation is distributed, negotiation for system-wide power down occurs within a lower level of a node hierarchy prior to negotiation for power down occurring at a higher level of the node hierarchy. When power down negotiation is centralized, a given node combines a state of its clients with indications received on its downstream link and sends an indication on an upstream link based on the combining. Only a root node sends power down requests.

20 Claims, 12 Drawing Sheets

(51) Int. Cl.
  *G06F 1/3234* (2019.01)
  *G06F 1/3287* (2019.01)
  *G06F 1/3296* (2019.01)
  *G06F 9/50* (2006.01)

(56) References Cited

U.S. PATENT DOCUMENTS

| | | | |
|---|---|---|---|
| 5,617,572 A | 4/1997 | Pearce et al. | |
| 5,692,202 A | 11/1997 | Kardach et al. | |
| 6,085,325 A * | 7/2000 | Jackson | G06F 1/325 |
| | | | 710/266 |
| 6,334,167 B1 | 12/2001 | Gerchman et al. | |
| 6,657,534 B1 | 12/2003 | Beer et al. | |
| 6,657,634 B1 | 12/2003 | Sinclair et al. | |
| 7,028,200 B2 | 4/2006 | Ma | |
| 7,085,941 B2 | 8/2006 | Li | |
| 7,103,788 B1 * | 9/2006 | Souza | G06F 1/3253 |
| | | | 713/323 |
| 7,428,644 B2 | 9/2008 | Jeddeloh et al. | |
| 7,437,579 B2 | 10/2008 | Jeddeloh et al. | |
| 7,496,777 B2 | 2/2009 | Kapil | |
| 7,613,941 B2 | 11/2009 | Samson et al. | |
| 7,743,267 B2 | 6/2010 | Snyder et al. | |
| 7,800,621 B2 | 9/2010 | Fry | |
| 7,802,060 B2 | 9/2010 | Hildebrand | |
| 7,840,827 B2 | 11/2010 | Dahan et al. | |
| 7,868,479 B2 | 1/2011 | Subramaniam | |
| 7,873,850 B2 | 1/2011 | Cepulis et al. | |
| 7,899,990 B2 | 3/2011 | Moll et al. | |
| 8,181,046 B2 | 5/2012 | Marcu et al. | |
| 8,402,232 B2 | 3/2013 | Avudaiyappan et al. | |
| 8,656,198 B2 | 2/2014 | Branover et al. | |
| 8,949,644 B2 | 2/2015 | Ma et al. | |
| 9,563,257 B2 | 2/2017 | Fang et al. | |
| 11,054,887 B2 | 7/2021 | Tsien et al. | |
| 2006/0271649 A1 | 11/2006 | Tseng et al. | |
| 2011/0083023 A1 | 4/2011 | Dickens et al. | |
| 2011/0264934 A1 | 10/2011 | Branover et al. | |
| 2012/0254526 A1 | 10/2012 | Kalyanasundharam | |
| 2013/0179621 A1 | 7/2013 | Smith et al. | |
| 2013/0279621 A1 | 10/2013 | Yonge | |
| 2013/0311804 A1 | 11/2013 | Garg et al. | |
| 2014/0019788 A1 | 1/2014 | Fang et al. | |
| 2016/0187952 A1 | 6/2016 | Gough et al. | |
| 2016/0378168 A1 | 12/2016 | Branover et al. | |
| 2017/0353926 A1 | 12/2017 | Zhu et al. | |
| 2018/0129269 A1 * | 5/2018 | Garg | G06F 9/4418 |
| 2018/0157311 A1 | 6/2018 | Maisuria et al. | |

OTHER PUBLICATIONS

International Search Report and Written Opinion in International Application No. PCT/US2018/051916, mailed Jan. 31, 2019, 10 pages.

Yuan et al., "Buffering Approach for Energy Saving in Video Sensors", 2003 International Conference on Multimedia and Expo, Jul. 2003, 4 pages.

"Intel Power Management Technologies for Processor Graphics, Display, and Memory: White Paper for 2010-2011 Desktop and Notebook Platforms", Intel Corporation, Aug. 2010, 10 pages.

Communication pursuant to Article 94(3) EPC in European Patent Application No. 18786482.2, mailed Sep. 20, 2022, 5 pages.

Non-Final Office Action in Japanese Patent Application No. 2020-536179, mailed Sep. 27, 2022, 9 pages.

Notice of Allowance for Japanese Application No. 2020-536179 dated Apr. 11, 2023.

EP Summons in European Appln. No. 18786482.2, dated Jun. 26, 23, 10 pgs.

"Anonymous: "Linux Network Tuning Guide for AMO EPYCProcessor Based Servers",EPO Form 2906 01 .91 TRI Nov. 1, 2017 (Nov. 1, 2017), XP093053234,Retrieved from the Internet:URL:https://www.amd.com/system/files/TechDocs/56224.pdf[retrieved on Jun. 9, 2023]", 15 pgs.

Office Action in Korean Patent Appln. No. 10-2020-7021981, dated Nov. 15, 2023, 18 pgs.

* cited by examiner

SYSTEM-WIDE LOW POWER MANAGEMENT

CROSS REFERENCE TO RELATED APPLICATIONS

This application is a continuation of U.S. patent application Ser. No. 15/856,546, now U.S. Pat. No. 11,054,887, entitled "SYSTEM-WIDE LOW POWER MANAGEMENT", Dec. 28, 2017, the entirety of which is incorporated herein by reference.

BACKGROUND

Description of the Related Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for desktop computers and servers utilizing high-performance microprocessors. These microprocessors include multiple processor cores, or cores, and multiple pipelines within a core.

A variety of computing devices, such as a variety of servers, utilize heterogeneous integration, which integrates multiple types of ICs for providing system functionality. The multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for system packaging to integrate the multiple types of ICs. In some computing devices, a system-on-a-chip (SOC) is used, whereas, in other computing devices, smaller and higher-yielding chips are packaged as large chips in multi-chip modules (MCMs). Some computing devices include three-dimensional integrated circuits (3D ICs) that utilize die-stacking technology as well as silicon interposers, through silicon vias (TSVs) and other mechanisms to vertically stack and electrically connect two or more dies in a system-in-package (SiP).

Regardless of the choice for system packaging, powering down the computing system with multiple sockets, each with a copy of the selected package, is complicated. Each package includes a power controller, and thus, the system has multiple power controllers. If each power controller is connected to each other power controller in the system, then communicating when to power down the system becomes easier. However, scaling the system, such as increasing the number of sockets for increasing performance, becomes difficult. In addition, routing the multiple connections increases the amount of signals between sockets and increases the area for interfaces.

In view of the above, efficient methods and systems for performing efficient power management for a multi-node computing system are desired.

BRIEF DESCRIPTION OF THE DRAWINGS

The advantages of the methods and mechanisms described herein may be better understood by referring to the following description in conjunction with the accompanying drawings, in which.

Figure 1:
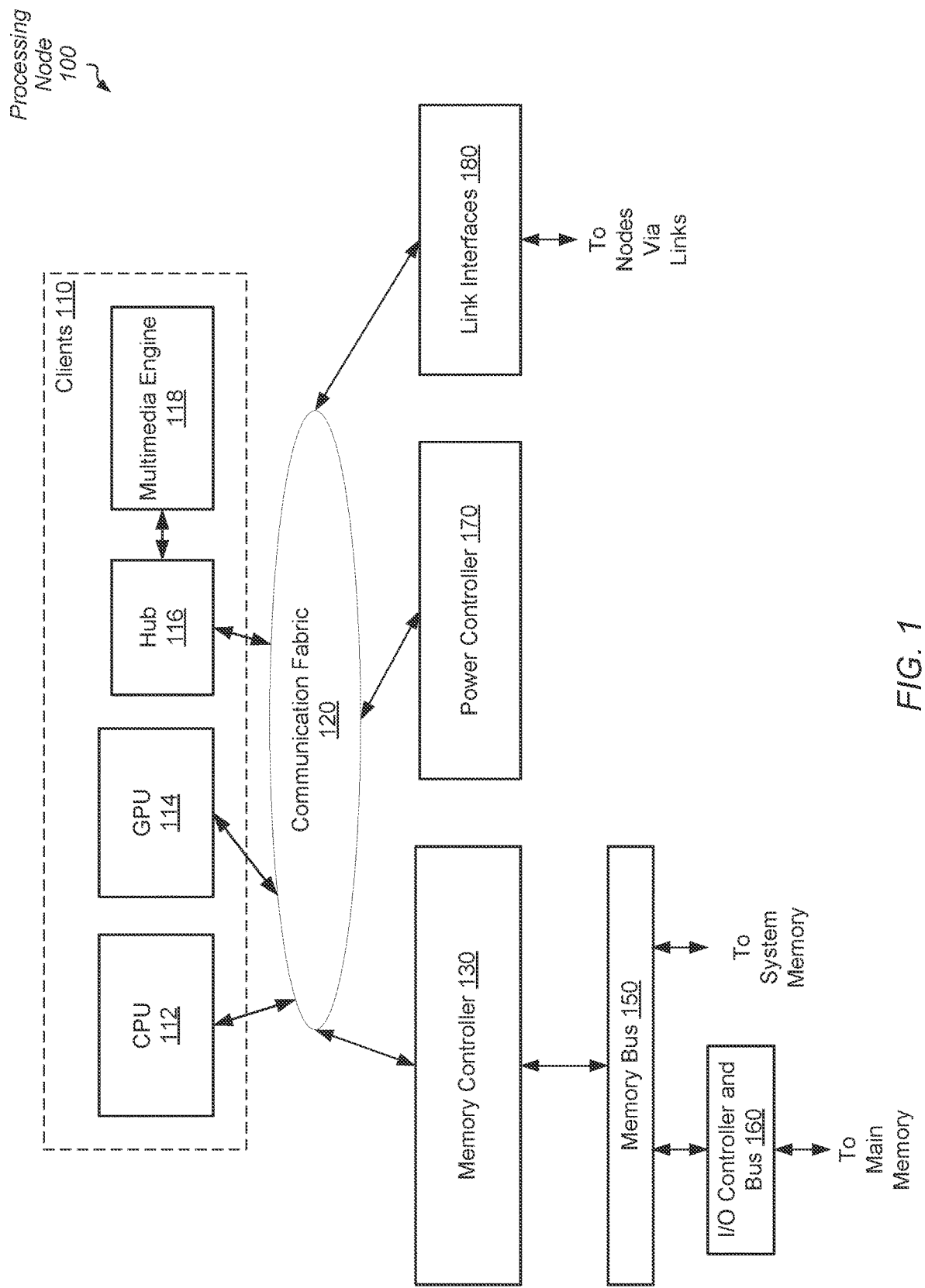
FIG. 1 is a block diagram of one embodiment of a processing node.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient power management for a multi-node computing system are disclosed. In various embodiments, a processing node includes one or more clients for processing applications. Examples of the clients within the node include a general-purpose central processing unit (CPU), a graphics processing unit (GPU), an accelerated processing unit (APU), an input/output (I/O) device and so forth. The processing node also includes at least a power controller, and multiple link interfaces for transferring messages with other nodes. As used herein, a processing node is also referred to as a node.

In various embodiments, a computing system is a multi-node system with two or more of the nodes are not fully connected to other nodes. Each node includes one or more clients, multiple link interfaces, and a power controller. Each node is able to power down its links and its clients when a first node determines each client in the multi-node system is idle despite the nodes are not fully connected. In an embodiment, the multi-node computing system uses a hierarchical topology where each node is a requestor. Negotiation for system-wide power down is distributed. Each node has one or more links at a low- or first-level of the hierarchy. The links at the first level are used to directly connect a subset of the nodes within a group together with one another. Additionally, one or more nodes have one or more links at a higher or second-level of the hierarchy. The links at the second level are used to directly connect a first node in a first group with a second node in a second group. When system-wide power down is distributed, any of the multiple nodes can be the first node, which initiates system-wide power down. Using the distributed approach for power management, negotiation for system-wide power down occurs within the lower level of the hierarchy prior to negotiation for power down continues at the higher level of the hierarchy.

In other embodiments, a multi-node computing system includes a tree hierarchy with one or more leaf nodes, a single root node, and one or more intermediate nodes between the root node and the one or more leaf nodes. Each intermediate node is directly connected to an upstream node and directly connected to a downstream node. The upstream direction is also referred to as the root direction, whereas, the downward direction is also referred to as the leaf direction. Negotiation for system-wide power down is centralized and it is performed by the root node. Negotiation for power up remains distributed and it is initiated by any of the nodes in the system. In various embodiments, each of the distributed approach and the centralized approach performs negotiation for power management that avoids powering down links prior to performing a system-wide power down, which removes the subsequent power up penalty.

Referring to FIG. 1, a generalized block diagram of one embodiment of a processing node 100 is shown. As shown, processing node 100 includes communication fabric 120 between each of clients 110, memory controller 130, power controller 170 and link interfaces 180. In some embodiments, the components of processing node 100 are individual dies on an integrated circuit (IC), such as a system-on-a-chip (SOC). In other embodiments, the components are individual dies in a system-in-package (SiP) or a multi-chip module (MCM).

In the illustrated embodiment, clients 110 include central processing unit (CPU) 112, graphics processing unit (GPU) 114 and Hub 116. Hub 116 is used for communicating with Multimedia Engine 118. The CPU 112, GPU 114 and Multimedia Engine 118 are examples of computing resources capable of processing applications. Although not shown, in other embodiments, other types of computing resources are included in clients 110. Each of the one or more processor cores in CPU 112 includes circuitry for executing instructions according to a given selected instruction set architecture (ISA). In various embodiments, each of the processor cores in CPU 112 includes a superscalar, multi-threaded microarchitecture used for processing instructions of the given ISA. In an embodiment, GPU 114 includes a high parallel data microarchitecture with a significant number of parallel execution lanes. In one embodiment, the microarchitecture uses single-instruction-multiple-data (SIMD) pipeline for the parallel execution lanes. Multimedia Engine 118 includes processors for processing audio data and visual data for multimedia applications.

In various embodiments, communication fabric 120 transfers traffic back and forth between computing resources 110 and memory controller 130 and includes interfaces for supporting respective communication protocols. In some embodiments, communication fabric 120 includes at least queues for storing requests and responses, selection logic for arbitrating between received requests before sending requests across an internal network, logic for building and decoding packets, and logic for selecting routes for the packets.

Although a single memory controller 130 is shown, in other embodiments, another number of memory controllers are used in processing node 100. In various embodiments, memory controller 130 receives memory requests from clients 110 via the communication fabric 120, schedules the memory requests, and sends the scheduled memory requests to one or more of system memory and main memory. Memory controller 130 also receives responses from system memory and main memory and sends the responses to a corresponding source of the request in clients 110. In various embodiments, system memory is filled with data from main memory through the I/O controller and bus 160 and the memory bus 150. A corresponding cache fill line with the requested block is conveyed from main memory to a corresponding one of the cache memory subsystems in clients 110 in order to complete the original memory request. The cache fill line is placed in one or more levels of caches.

In some embodiments, the address space of processing node 100 is divided among at least CPU 112, GPU 114 and Hub 116 and one or more other components such as input/output (I/O) peripheral devices (not shown) and other types of computing resources. Memory maps are maintained for determining which addresses are mapped to which component, and hence to which one of CPU 112, GPU 114 and Hub 116 a memory request for a particular address should be routed. In an embodiment, system memory is one of a variety of dynamic random access memory (DRAM) and a corresponding protocol is supported by memory controller 130. The protocol determines values used for information transfer, such as a number of data transfers per clock cycle, signal voltage levels, signal timings, signal and clock phases and clock frequencies. In some embodiments, main memory is one of a variety of types of non-volatile, random access secondary storage of data. Examples of main memory are hard disk drives (HDDs) and solid-state disks (SSDs).

Link interfaces 180 support communication between processing node 100 and other processing nodes by transferring messages on links. In various embodiments, the messages sent across the links between nodes include an indication of an operating state for one or more nodes, a power down request, responses to requests, interrupts, and other information. In various embodiments, each link is a point-to-point communication channel between two nodes. At the physical level, a link includes one or more lanes. In some embodiments, link interfaces 180, the corresponding links, and other nodes include communication protocol connections such as PCIe (Peripheral Component Interconnect Express), InfiniBand, RapidIO, HyperTransport, and so forth. In some embodiments, link interfaces 180 include control logic and buffers or queues used to communicate with other nodes via the interconnect links.

In one embodiment, power controller 170 collects data from clients 110. In some embodiments, power controller 170 also collects data from memory controller 130. In some embodiments, the collected data includes predetermined sampled signals. The switching of the sampled signals indicates an amount of switched capacitance. Examples of the selected signals to sample include clock gater enable signals, bus driver enable signals, mismatches in content-addressable memories (CAM), CAM word-line (WL) drivers, and so forth. In an embodiment, power controller 170 collects data to characterize power consumption in node 100 during given sample intervals.

In some embodiments, on-die current sensors and temperature sensors in node 100 also send information to power controller 170. Power controller 170 uses one or more of the sensor information, a count of issued instructions or issued threads, and a summation of weighted sampled signals to estimate power consumption for node 100. Power controller 170 decreases (or increases) power consumption if node 100 is operating above (below) a threshold limit. In some embodiments, power controller 170 selects a respective power-performance state (P-state) for each of the computing resources in clients 110. The P-state includes at least an operating voltage and an operating clock frequency. In various embodiments, power controller 170 and node 100 supports N P-states where N is a positive non-zero integer.

In various embodiments, power controller 170 detects when one or more of clients 110 become idle. If each of the clients 110 becomes idle, then power controller 170 relays this information to one or more nodes via link interfaces 180. In an embodiment, whether power controller 170 sends information on one link or multiple links is based on whether negotiation for system-wide power down is distributed or centralized. For example, in various embodiments, node 100 is one node of multiple nodes in a multi-node system. In an embodiment, the system is a server of multiple servers. Sometimes jobs sent as a batch to the servers are not assigned to each server. A given server can become idle for an appreciable amount of time. To reduce power consumption, the multiple nodes within the server can power down. However, since one or more nodes are not directly connected to one another, communication among the power controllers within the nodes for power down is not straight forward. Each of a distributed approach and a centralized approach for negotiating system-wide power down is provided in the following description.

Figure 2:
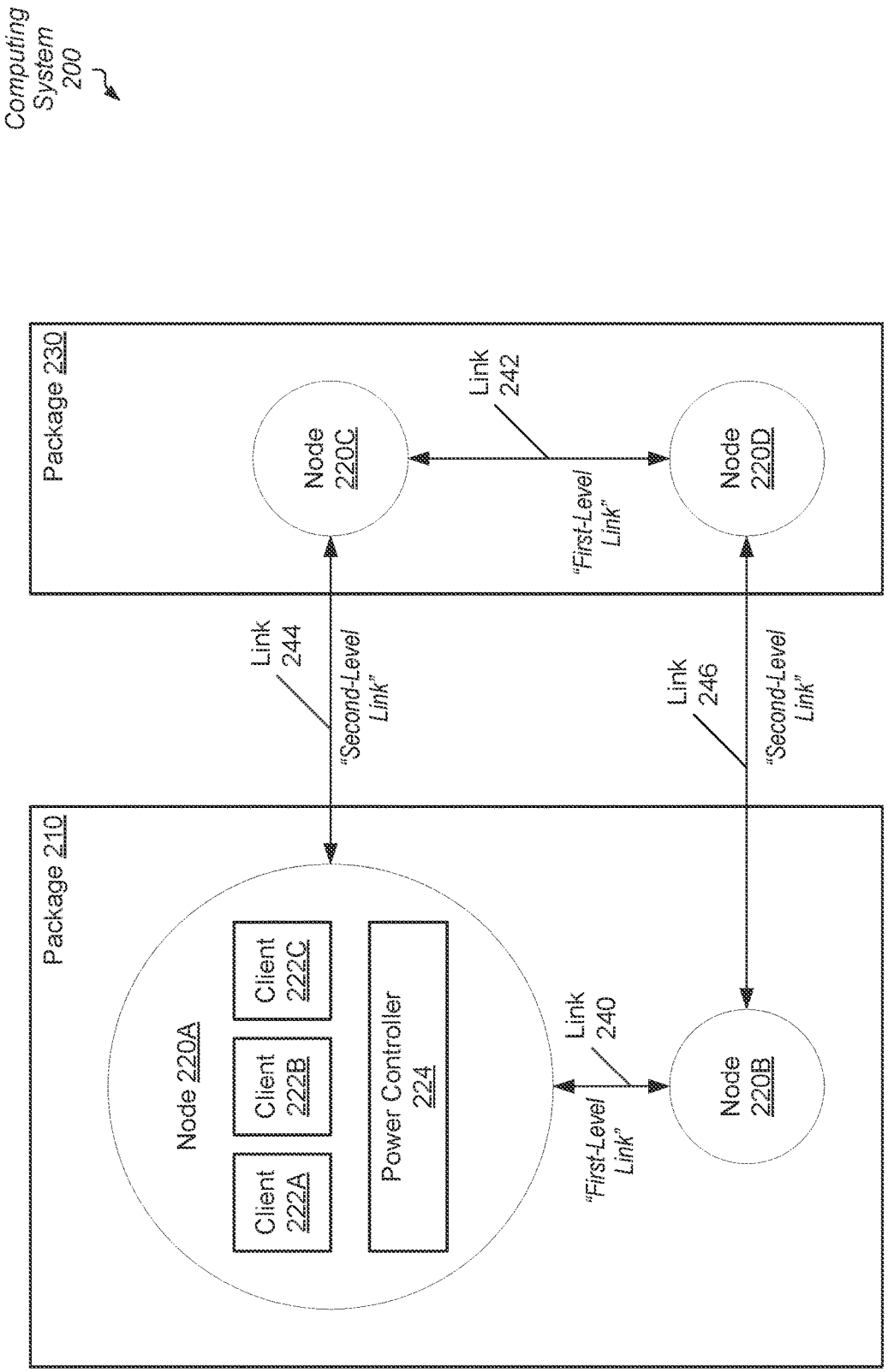
FIG. 2 is a block diagram of one embodiment of a multi-node computing system.

Referring to FIG. 2, a generalized block diagram of one embodiment of a multi-node computing system 200 is shown. In the illustrated embodiment, package 210 includes nodes 220A and 220B directly connected to one another by link 240. In some embodiments, each of package 210 and 230 is a multi-chip module (MCM) placed in a socket of a multi-socket motherboard in a server. As shown, node 220A includes clients 222A-222C and a power controller 224. Link interfaces, a communication fabric, a memory interface, phased locked loops (PLLs) or other clock generating circuitry are not shown for ease of illustration. Examples of clients 222A-222C are a CPU, a GPU, a multimedia engine, an I/O peripheral device, and so forth. In various embodiments, power controller 224 has the functionality of power controller 170 (of FIG. 1).

In an embodiment, links 240-246 utilize communication protocol connections such as PCIe, InfiniBand, RapidIO, HyperTransport, and so forth. In some embodiments, computing system 200 includes other links between nodes 220A-220D in addition to links 240-246. In an embodiment, these other links are used for data transport to service requests, whereas links 240-246 are used for messaging such as messages for negotiating system-wide power down.

In various embodiments, computing system 200 uses a hierarchical topology where each of the nodes 220A-220D is a requestor. The links at the first level are used to directly connect a subset of the nodes 220A-220D within a group or cluster together with one another. For example, node 220A is directly connected to node 220B in package 210 through first-level link 240. Similarly, node 220C is directly connected to node 220D in package 230 through first-level link 242. The links at the second level are used to directly connect a first node in a first cluster with a second node in a second cluster. For example, node 220A in package 210 is directly connected to node 220C in package 230 through second-level link 244. However, node 220A is not directly connected to node 220D in package 230. Similarly, node 220B in package 210 is directly connected to node 220D in package 230 through second-level link 246. However, node 220B is not directly connected to node 220C in package 230. The second-level links 244 and 246 are a higher level in the hierarchy than the first-level links 240 and 242.

Using the distributed approach for power management, negotiation for system-wide power down in computing system 200 occurs within the lower level of the hierarchy prior to negotiation for power down continues at the higher level of the hierarchy. In the illustrated embodiment, each of the nodes 220A-220D has two links. For example, node 220A has links 240 and 244. However, in other embodiments, another number of nodes in packages and another number of links are used.

In an embodiment, power controller 224 of node 220A is able to send an indication to node 220C on second-level link 244 specifying that each client in a first subset of nodes 220A-220D is idle. Node 220C is not connected to any other nodes connected to node 220A. The first subset of nodes includes node 220A and node 220B. Power controller 224 of node 220A sends this indication to node 220C when power controller 224 determines each one of clients 222A-222C is idle and an indication is received from node 220B on first-level link 240 that each client in a second subset smaller than the first subset of the multiple nodes is idle. In this example, the second subset includes each client in node 220B.

Power controller 224 of node 220A is capable of sending a request to power down to each directly connected neighboring node, such as node 220B and node 220C, when node 220A receives on each of its links 240 and 244 an indication that each client in a given subset nodes is idle and power controller 224 determines each one of clients 222A-222C is idle. Power controllers in the other nodes 220B-220D are capable of sending power down requests in a similar manner.

Figure 3:
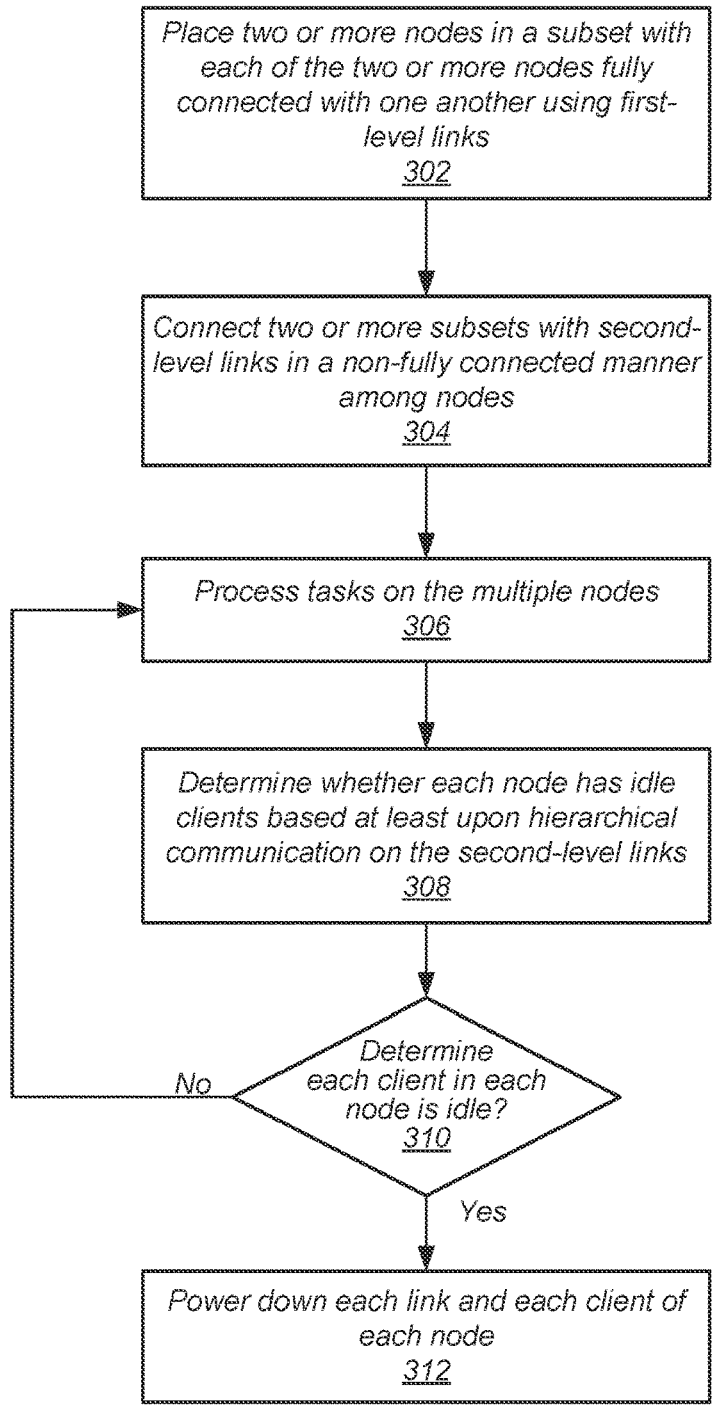
FIG. 3 is a flow diagram of one embodiment of a method for performing power management for a multi-node computing system.

Referring now to FIG. 3, one embodiment of a method 300 for performing power management for a multi-node computing system is shown. For purposes of discussion, the steps in this embodiment (as well as in FIGS. 4-7 and 9-12) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

Two or more nodes are placed in a subset with each of the two or more nodes fully connected with one another using first-level links (block 302). Two or more subsets are connected with second-level links in a manner that is not fully connected among nodes (block 304). An example of such a hierarchy is provided in computing system 200 (of FIG. 2). Each node within a given subset is connected to each other subset via a second-level link, but each node within the given subset is not connected to each other node in another subset. Referring to computing system 200, if another subset is added, then each of nodes 220A and 220B in package 210 has an additional second-level link to a node in the other subset. The same connectivity is used for nodes 220C and 220D in package 230. Therefore, the multi-node system efficiently scales in size since each node in the system in not fully connected to each other node in the system. System-wide power down is distributed. Any of the multiple nodes can initiate system-wide power down. Negotiation for system-wide power down occurs within the lower level of the hierarchy on the first-level links prior to negotiation for power down continues at the higher level of the hierarchy on the second-level links.

Multiple nodes process tasks (block 306). One or more clients within the nodes execute computer programs, or software applications. In some embodiments, the multiple nodes are within a multi-socket server and batch jobs are received by the operating system, which assigns tasks to the one or more of the multiple nodes. The power controllers in the nodes determine whether each node has idle clients based at least upon hierarchical communication on the second-level links (block 308). Therefore, system-wide power down occurs without relying on fully connected nodes in the system, which permits efficient scaling in size. Additionally, negotiation for power management avoids powering down links prior to performing a system-wide power down, which removes the subsequent power up penalty.

If it is determined that one or more clients in the multi-node system are non-idle ("no" branch of the conditional block 310), then control flow of method 300 returns to block 306 where tasks are processed with multiple nodes while one or more clients are non-idle. Even if all but one node in the computing system has only idle clients, no power down requests are generated. If it is determined that each client in each node is idle ("yes" branch of the conditional block 310), then each link and each client of each node is powered down (block 312). The system-wide power down occurs despite multiple nodes are not connected to one another. In various embodiments, powering down the given node includes one or more of disabling drivers for link interfaces, disabling clocks for clients and setting system memory to perform self-refresh when DRAM is used.

Figure 4:
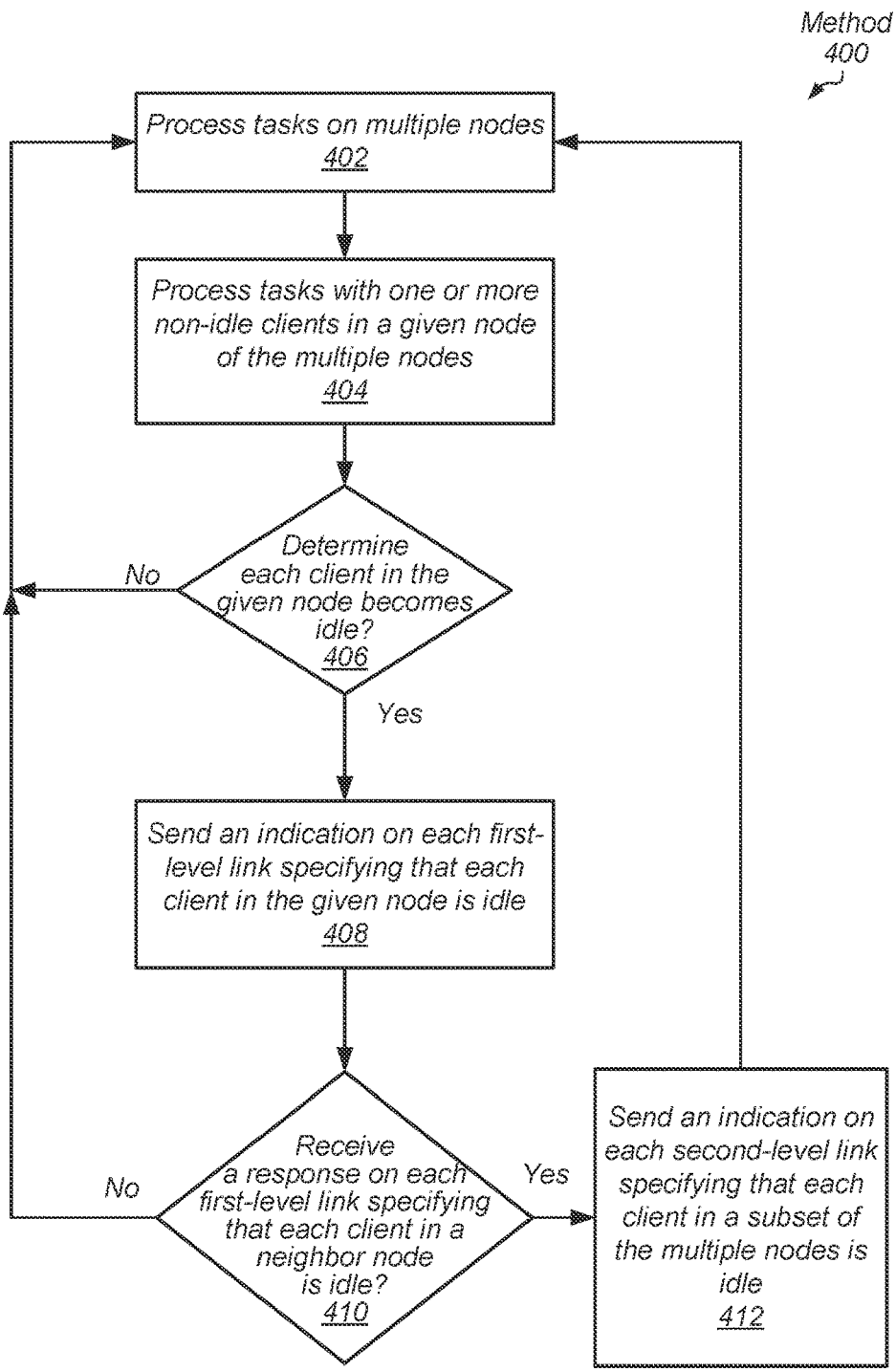
FIG. 4 is a flow diagram of another embodiment of a method for performing power management for a multi-node computing system.

Referring now to FIG. 4, another embodiment of a method 400 for performing power management for a multi-node computing system is shown. Similar to method 300 and methods 500-700, the multi-node computing system for method 400 uses a hierarchical topology where each node is a requestor, and negotiation for system-wide power down is distributed. For example, negotiation for system-wide power down occurs within the lower level of the hierarchy on the first-level links prior to negotiation for power down continuing at the higher level of the hierarchy on the second-level links. Multiple nodes process tasks (block 402) while negotiation for system-wide power down is distributed.

One or more non-idle clients on a given node process one or more tasks (block 404). If each client in the given node becomes idle ("yes" branch of the conditional block 406), then an indication is sent on each first-level link specifying that each client in the given node is idle (block 408). If a response is received on each first-level link specifying that each client in a neighbor node is idle ("yes" branch of the conditional block 410), then an indication is sent on each second-level link specifying that each client in a subset of the multiple nodes is idle (block 412). Therefore, hierarchical communication in this case continues only when clients are found to be idle in the nodes providing responses. The steps in blocks 408-412 gate propagation of negotiating system-wide power down to the next higher level of the hierarchy.

Figure 5:
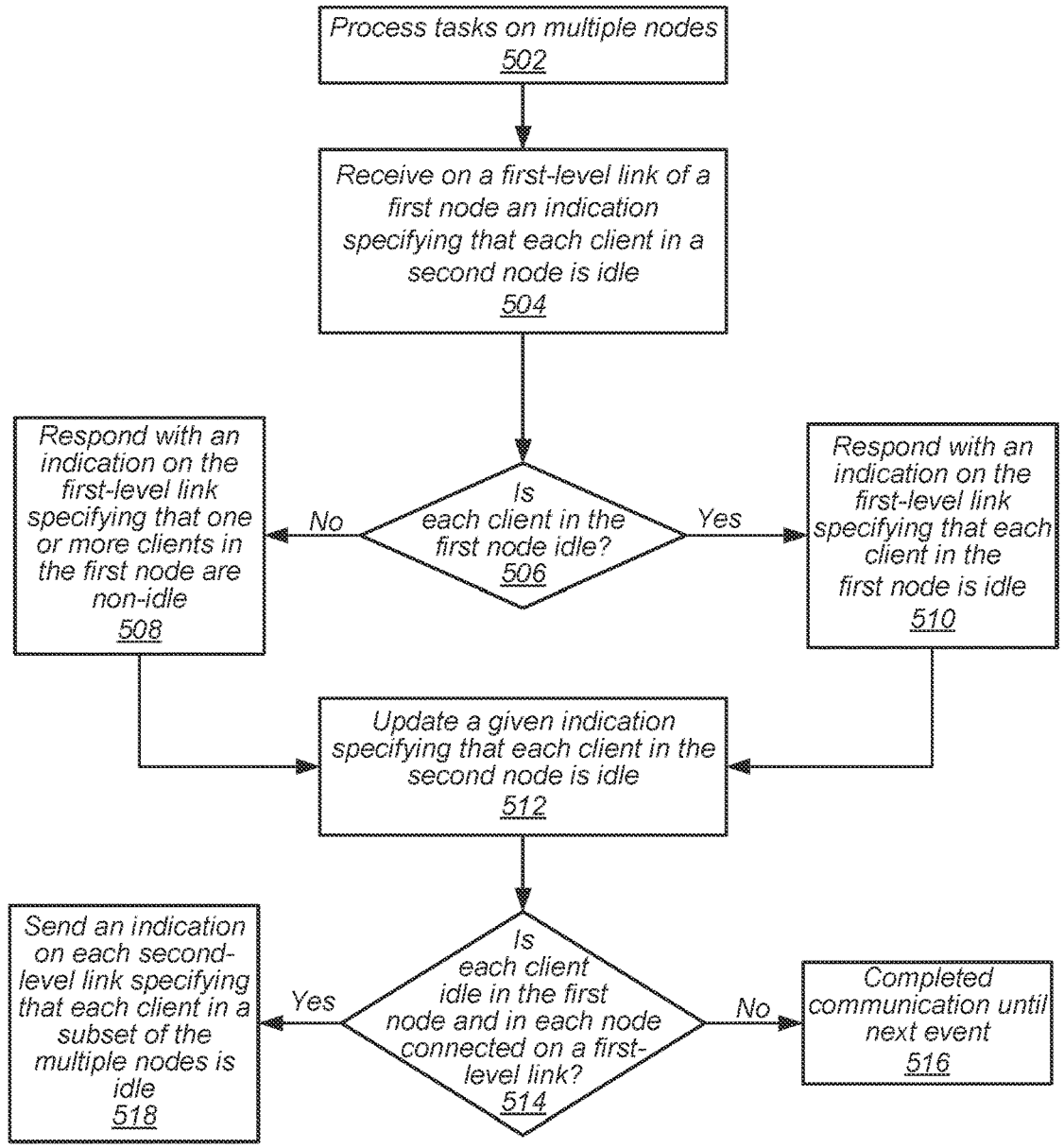
FIG. 5 is a flow diagram of another embodiment of a method for performing power management for a multi-node computing system.

Turning now to FIG. 5, another embodiment of a method 500 for performing power management for a multi-node computing system is shown. Multiple nodes process tasks (block 502) while negotiation for system-wide power down is distributed. An indication is received on a first-level link of a first node specifying that each client in a second node is idle (block 504). If one or more clients are non-idle in the first node ("no" branch of the conditional block 506), then the first node responds to the second node with an indication on the first-level link specifying that one or more clients in the first node are non-idle (block 508). If each client is idle in the first node ("yes" branch of the conditional block 506), then the first node responds to the second node with an indication on the first-level link specifying that each client in the first node is idle (block 510).

A given indication is updated in the first node to specify that each client in the second node is idle (block 512). If one or more clients are non-idle in the first node or in any node connected to the first node on a first-level link ("no" branch of the conditional block 514), then control flow of method 500 moves to block 516 where hierarchical communication is completed.

If each client is idle in the first node and in any node connected to the first node on a first-level link ("yes" branch of the conditional block 514), then an indication is sent on each second-level link specifying that each client in a subset of the multiple nodes is idle (block 518). For example, the first node and each node fully connected to the first node with first-level links is the subset of multiple nodes. Referring briefly to FIG. 2, package 210 is the subset of multiple nodes. In some embodiments, method 500 is used when node 220B receives an indication on first-level link 240 specifying that each one of clients 222A-222C on node 220A is idle, and node 220B responds to node 220A. Additionally, in some embodiments, node 220B sends an indication to node 220D when node 220B determines each of node 220A and node 220B do not have any non-idle clients. Further, in an embodiment, method 500 is used when node 220A receives an indication on first-level link 240 specifying that each client on node 220B is idle, and node 220A responds to node 220B and conditionally sends an indication to node 220C.

Figure 6:
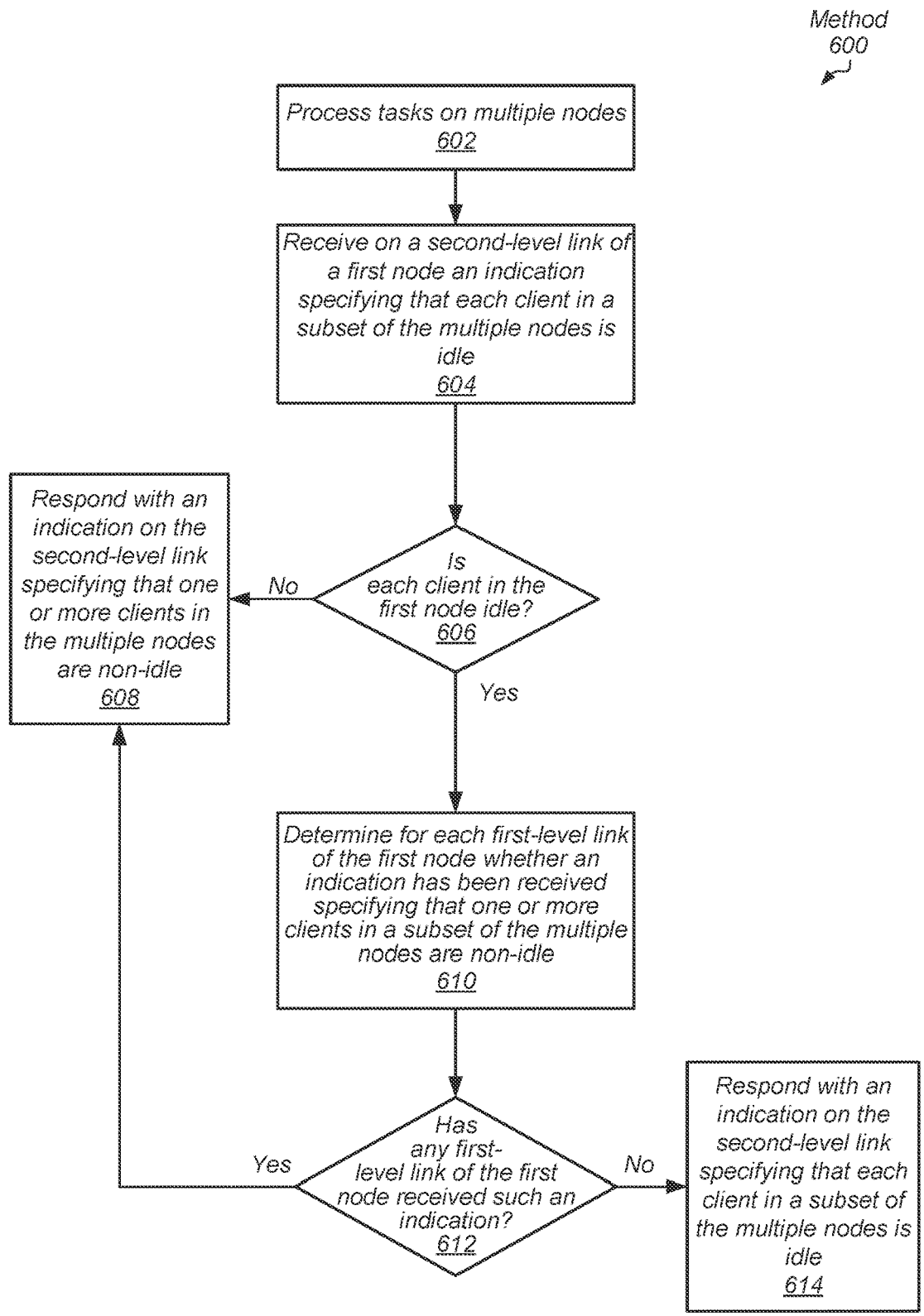
FIG. 6 is a flow diagram of another embodiment of a method for performing power management for a multi-node computing system.

Referring now to FIG. 6, another embodiment of a method 600 for performing power management for a multi-node computing system is shown. Multiple nodes process tasks (block 602) while negotiation for system-wide power down is distributed. An indication is received on a second-level link of a first node specifying that each client in a subset of the multiple nodes is idle (block 604). For example, the subset is a group of nodes fully connected to one another with first-level links. Package 210 (of FIG. 2) with nodes 220A and 220B is one example of the subset and node 220C receives the indication on second-level link 244.

If one or more clients are non-idle in the first node ("no" branch of the conditional block 606), then the first node responds with an indication on the second-level link specifying that one or more clients in the multiple nodes are non-idle (block 608). If each client is idle in the first node ("yes" branch of the conditional block 606), then for each first-level link of the first node it is determined whether an indication has been received by the first node specifying that one or more clients in a subset of the multiple nodes are non-idle (block 610). If any first-level link of the first node has received such an indication ("yes" branch of the conditional block 612), then control flow of method 600 moves to block 608 where the first node responds with an indication on the second-level link specifying that one or more clients in the multiple nodes are non-idle. If no first-level link of the first node has received such an indication ("no" branch of the conditional block 612), then the first node responds with an indication on the second-level link specifying that each client in a subset of the multiple nodes is idle (block 614).

Referring briefly to FIG. 2, package 230 is the subset of multiple nodes. In some embodiments, method 600 is used when node 220C receives on second-level link 244 an indication specifying that each client in a subset, such as package 210, is idle. Node 220C responds on second-level link 244 to node 220A based on whether clients of node 220C are idle and on received indications from node 220D on first-level link 242.

Figure 7:
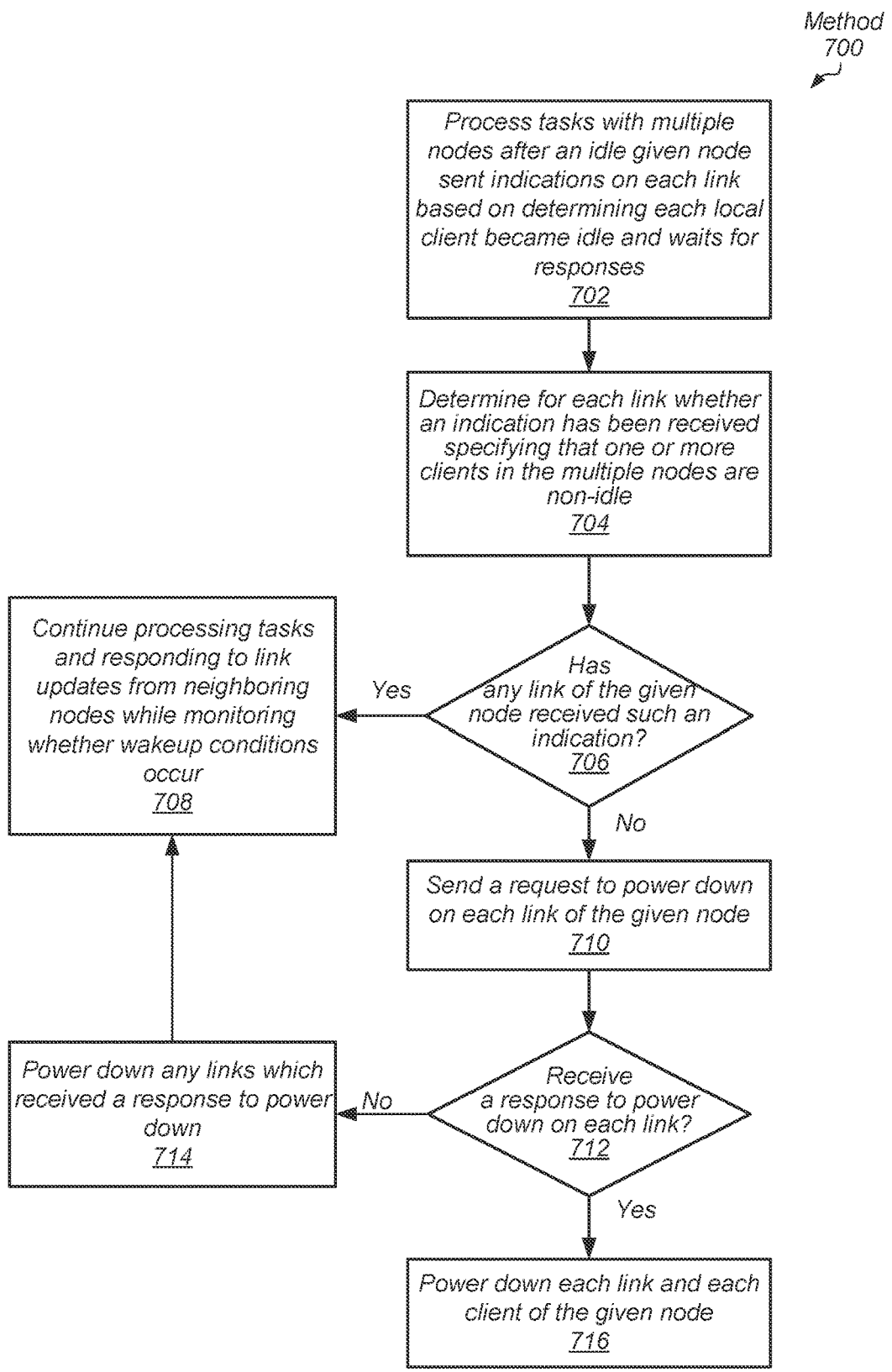
FIG. 7 is a flow diagram of another embodiment of a method for performing power management for a multi-node computing system.

Referring now to FIG. 7, another embodiment of a method 700 for performing power management for a multi-node computing system is shown. Negotiation for system-wide power down is distributed. Tasks are processed with multiple nodes after an idle given node sent indications on each link (first-level and second-level) based on at least determining each local client became idle and waits for responses (block 702). In various embodiments, the given node initially notified nodes on first-level links prior to notifying nodes on second-level links. For each link it is determined whether an indication has been received specifying that one or more clients in the multiple nodes are non-idle (block 704).

If any link (first-level or second-level) of the given node has received such an indication ("yes" branch of the conditional block 706), then the multiple nodes continue processing tasks and responding to link updates from neighboring nodes while monitoring whether wakeup conditions occur (block 708). Examples of wakeup conditions are one or more of receiving assigned tasks from the operating system, receiving a remote request for a local cache probe or a remote memory request for local data in system memory from another node with one or more non-idle clients, and so forth. If no link (first-level or second-level) of the given node has received such an indication in responses ("no" branch of the conditional block 706), then a request is sent on each link of the given node to power down (block 710).

If a response is not received to power down on each link ("no" branch of the conditional block 712), then any links which received a response to power down is powered down (block 714). Afterward, control flow of method 700 moves to block 708 where the multiple nodes continue processing tasks. If responses are received to power down on each link ("yes" branch of the conditional block 712), then each link and each client of the given node is powered down (block 714). Other nodes also perform these steps. The system-wide power down occurs despite multiple nodes not being connected to one another. In various embodiments, powering down the given node includes one or more of disabling drivers for link interfaces, disabling clocks for clients, setting system memory to perform self-refresh when DRAM is used, disabling clocks for each component in the node other than the power controller (not just for clients), performing other steps to power down in addition to disabling clocks for the memory controller, the communication fabric, the memory and input/output (I/O) drivers, network interfaces, and selecting a retention voltage.

In various embodiments, when a given node receives a power down request on a given link, the given node determines whether each of its clients is idle. If so, then the given node responds on the given link with a response indicating a power down. Afterward, the given node powers down the given link. In addition, the given node sends the power down request on each other link, if any, of the given node. If the given node receives a power down response on a particular link of these other links, then the given node powers down this particular link. If each link of the given node has transferred both a power down request and a power down response, then the given node powers down each link. When each link has been powered down in the given node, the given node proceeds with powering down each client. In some embodiments, when the given node determines at least one of its clients is non-idle, the given node responds to the power down request on the given link with an indication that the given node is not going to power down. Additionally, in an embodiment, the given node does not send any power down requests on other links.

Figure 8:
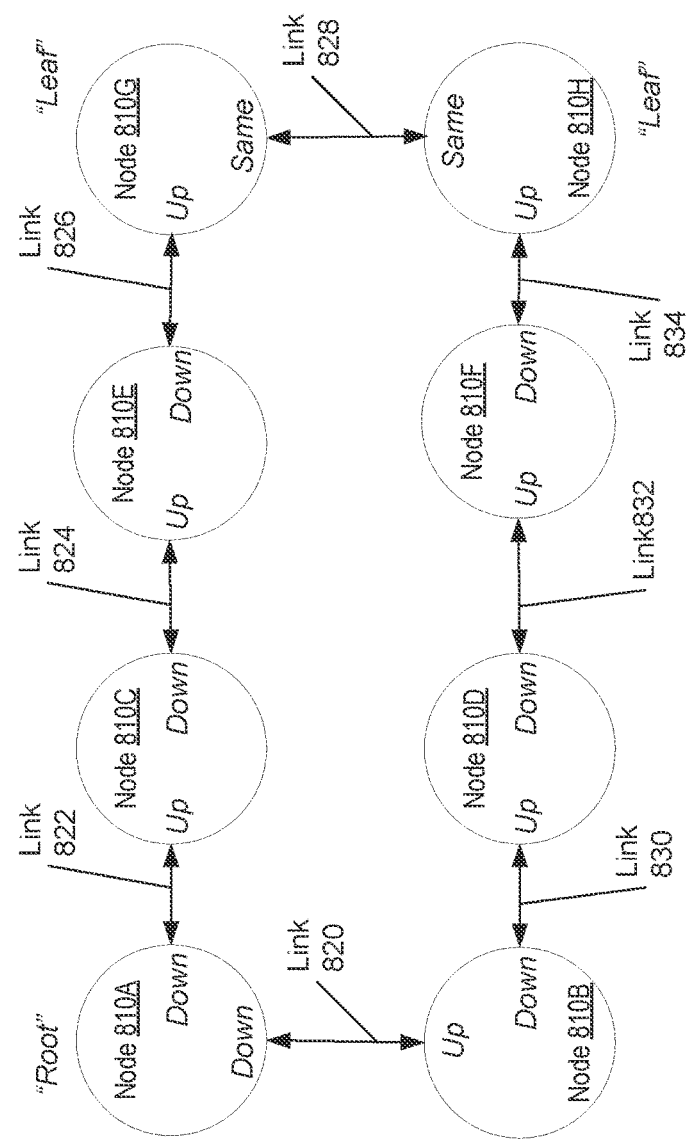
FIG. 8 is a block diagram of another embodiment of a multi-node computing system.

Referring to FIG. 8, a generalized block diagram of another embodiment of a multi-node computing system 800 is shown. In the illustrated embodiment, node 810A is a root node (master node) of computing system 800, whereas each of node 810G and node 810H are leaf nodes. Each of nodes 810B-810F are intermediate nodes between the root node 810A and the leaf nodes 810G-810H. Thus, a ring data communication topology is used. However, to support system-wide, hierarchical communication power management, a tree hierarchical topology is used within the ring topology. Negotiation for system-wide power down is centralized and it is performed by root node 810A in computing system 800. Negotiation for power up remains distributed and it is initiated by any of the nodes in the system. Although not shown, each of nodes 810A-810H includes one or more clients, a power controller, link interfaces, a communication fabric, a memory interface, phased locked loops (PLLs) or other clock generating circuitry, and so forth. Examples of clients are a CPU, a GPU, a multimedia engine, an I/O peripheral device, and so forth. In various embodiments, the power controllers have the functionality of power controller 170 (of FIG. 1).

In an embodiment, links 820-834 utilize communication protocol connections such as PCIe, InfiniBand, RapidIO, HyperTransport, and so forth. In some embodiments, computing system 800 includes other links between nodes 810A-810H in addition to links 820-834. These other links (not shown) are used for data communication, whereas links 820-834 are used for power management messaging. Therefore, in an embodiment, these other links are used for data transport to service requests, whereas, links 820-834 are used for messaging such as messages for negotiating system-wide power down. As shown, each one of the intermediate nodes 810B-810F is directly connected to a single upstream node and directly connected to a single downstream node. The upstream direction is also referred to as the root direction, whereas the downward direction is also referred to as the leaf direction. Each of the upstream direction and the downstream direction refers to the power management messaging, rather than the data communication used to service requests. Each of the leaf nodes additionally uses link 828, which has a same level on each end, rather than an upstream end and a downstream end. In an embodiment, the same level is the treated as a downstream level by power management control logic.

Figure 9:
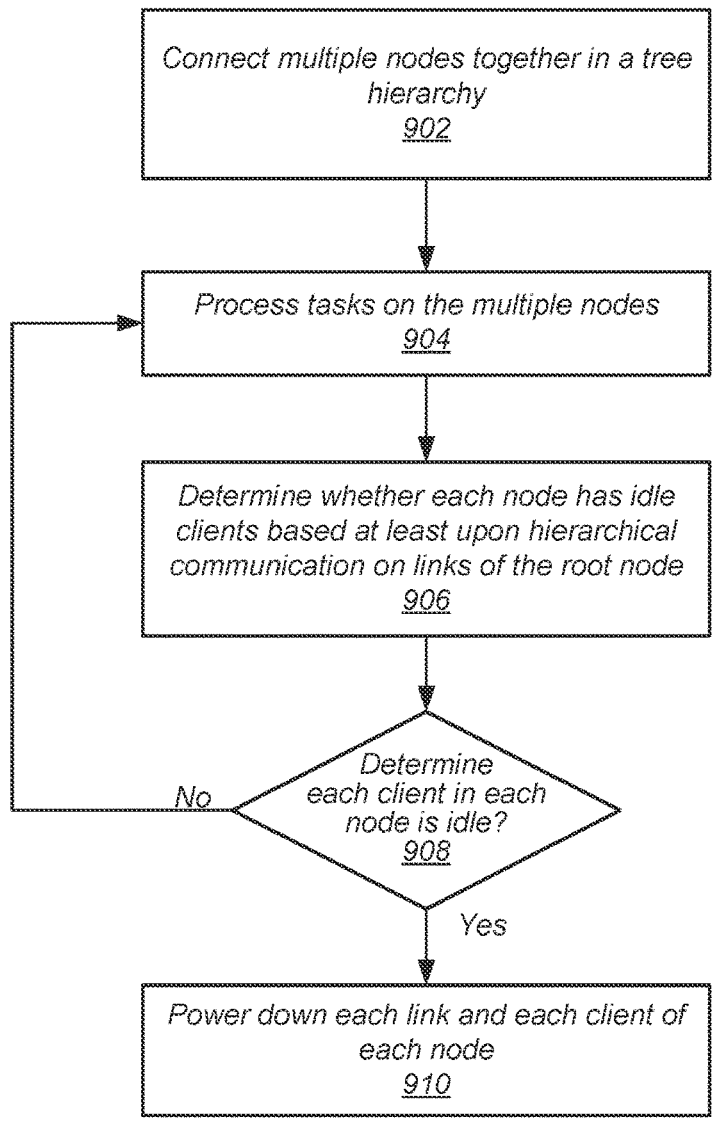
FIG. 9 is a flow diagram of another embodiment of a method for performing power management for a multi-node computing system.

Referring now to FIG. 9, one embodiment of a method 900 for performing power management for a multi-node computing system is shown. In various embodiments, a multi-node computing system connects multiple nodes in a tree hierarchical topology for power management purposes, which includes a single root node (master node), one or more leaf nodes and one or more intermediate nodes between the root node and the one or more leaf nodes (block 902). In some embodiments, the multi-node computing system uses a ring topology for data communication used to service requests, and the tree topology is used for power management messaging. In an embodiment, each intermediate node is directly connected to a node in an upstream direction and directly connected to a node in a downstream direction. In other words, negotiation for system-wide power down is centralized, whereas system-wide power up remains distributed. However, scaling the system, such as increasing the number of sockets for increasing performance, becomes more efficient as the nodes are not fully connected. In addition, routing the connections when the nodes are not fully connected uses a smaller amount of signals between sockets and reduces the area for interfaces. Therefore, system-wide power down occurs without relying on fully connected nodes in the system, which permits efficient scaling in size. Additionally, negotiation for power management avoids powering down links prior to performing a system-wide power down, which removes the subsequent power up penalty.

The multiple nodes process tasks (block 904). One or more clients within the nodes execute computer programs, or software applications. In some embodiments, the multiple nodes are within a multi-socket server and batch jobs are received by the operating system, which assigns tasks to the one or more of the multiple nodes. It is determined whether each node has idle clients based at least upon hierarchical communication on links of the root node (block 906).

If it is determined that one or more clients in the multi-node system are non-idle ("no" branch of the conditional block 908), then control flow of method 900 returns to block 904 where tasks are processed with multiple nodes while one or more clients are non-idle. Even if all but one node in the computing system has only idle clients, no power down requests are generated. If it is determined that each client in each node is idle ("yes" branch of the conditional block 908), then each link and each client of each node is powered down (block 910). The system-wide power down occurs despite multiple nodes not being connected to one another. In various embodiments, powering down the given node includes one or more of disabling drivers for link interfaces, disabling clocks for clients and setting system memory to perform self-refresh when DRAM is used.

Figure 10:
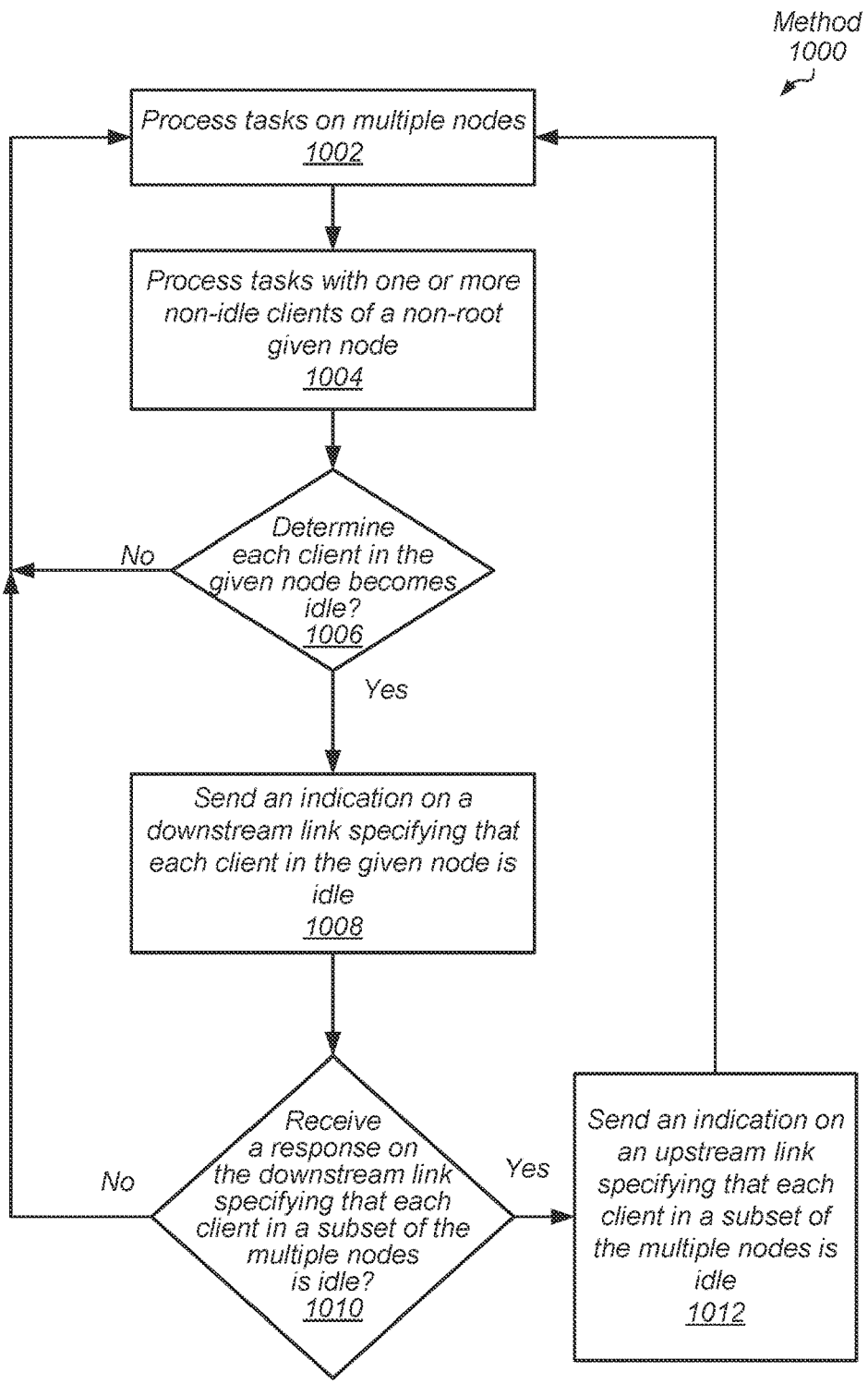
FIG. 10 is a flow diagram of another embodiment of a method for performing power management for a multi-node computing system.

Referring now to FIG. 10, another embodiment of a method 1000 for performing power management for a multi-node computing system is shown. Similar to method 900 and methods 1100-1200, the multi-node computing system for method 1000 uses a tree hierarchical topology, which includes a single root node (master node), one or more leaf nodes and one or more intermediate nodes between the root node and the one or more leaf nodes. Each intermediate node is directly connected to a node in an upstream direction and directly connected to a node in a downstream direction. In other words, negotiation for system-wide power down is centralized, whereas system-wide power up remains distributed.

Multiple nodes process tasks (block 1002). One or more clients within the nodes execute computer programs, or software applications. In some embodiments, the multiple nodes are within a multi-socket server and batch jobs are received by the operating system, which assigns tasks to the one or more of the multiple nodes. One or more non-idle clients on a non-root given node process one or more tasks (block 1004). If each client in the given node becomes idle ("yes" branch of the conditional block 1006), then an indication is sent on a downstream link specifying that each client in the given node is idle (block 1008). If a response is received on the downstream link of the given node specifying that each client in a subset of the multiple nodes is idle ("yes" branch of the conditional block 1010), then an indication is sent on the upstream link specifying that each client in a subset of the multiple nodes is idle (block 1012). Therefore, hierarchical communication in this case continues only when clients are found to be idle in the nodes providing responses. The steps in blocks 1008-1012 gate propagation of negotiating system-wide power down to the next higher level of the hierarchy.

Figure 11:
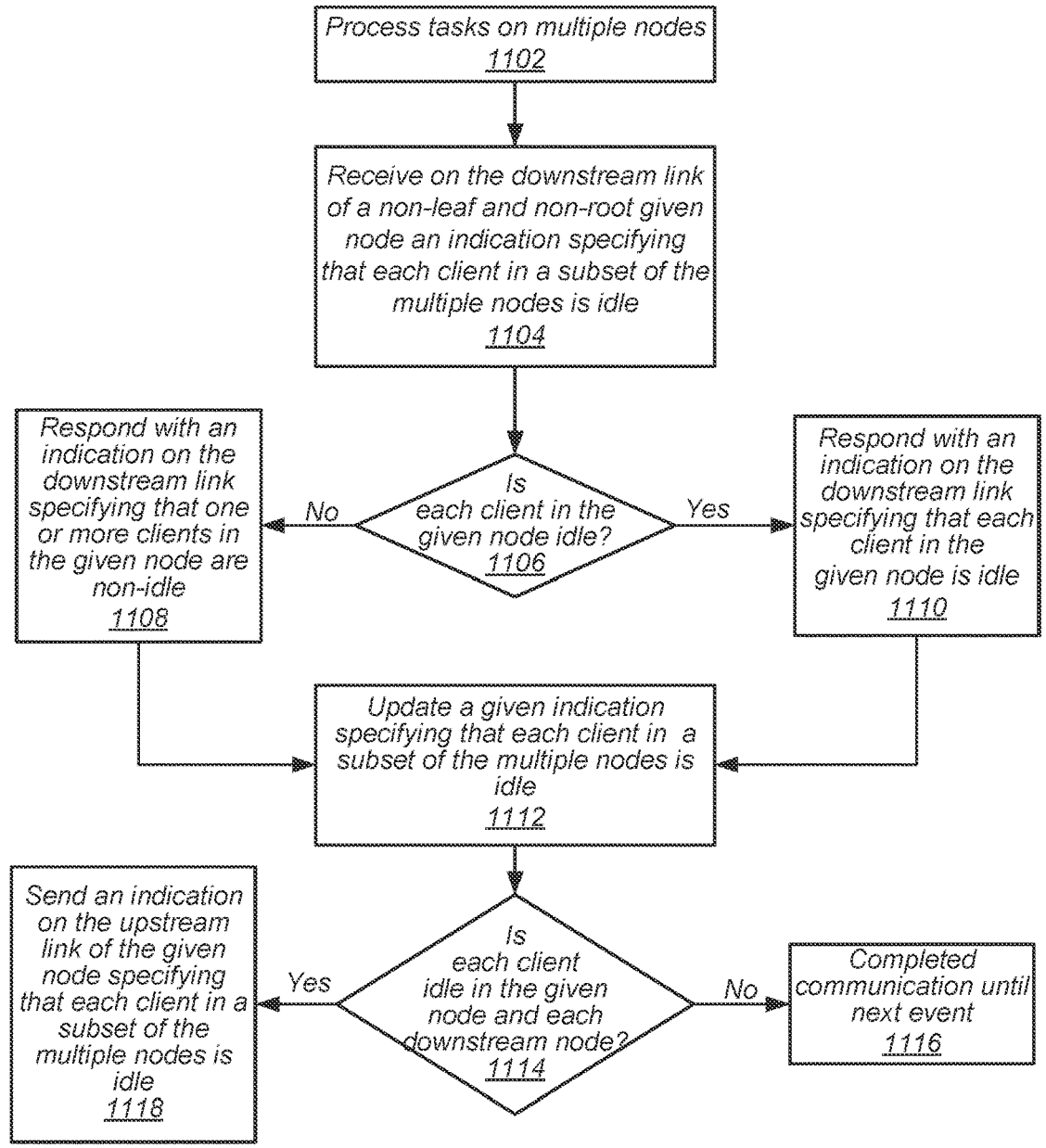
FIG. 11 is a flow diagram of another embodiment of a method for performing power management for a multi-node computing system.

Turning now to FIG. 11, another embodiment of a method 1100 for performing power management for a multi-node computing system is shown. Multiple nodes process tasks (block 1102). An indication is received on the downstream link of a non-leaf and non-root given node specifying that each client in a subset of the multiple nodes is idle (block 1104). For example, the subset includes each node downstream from the given node. If one or more clients of the given node are non-idle ("no" branch of the conditional block 1106), then, in an embodiment, the given node responds with an indication on the downstream link specifying that one or more clients in the given node are non-idle (block 1108). If each client is idle in the given node ("yes" branch of the conditional block 1106), then, in an embodiment, the given node responds with an indication on the downstream link specifying that each client in the given node is idle (block 1110).

A given indication is updated in the given node to specify that each client in the subset of multiple nodes is idle (block 1112). The subset includes each node downstream from the given node to a leaf node. If one or more clients are non-idle in the given node or in any node downstream from the given node ("no" branch of the conditional block 1114), then control flow of method 1100 moves to block 1116 where hierarchical communication is completed. If each client is idle in the given node and in any node downstream from the given node ("yes" branch of the conditional block 1114), then an indication is sent on an upstream link specifying that each client in a subset of the multiple nodes is idle (block 1118). The subset includes the given node and each node downstream from the given node.

Figure 12:
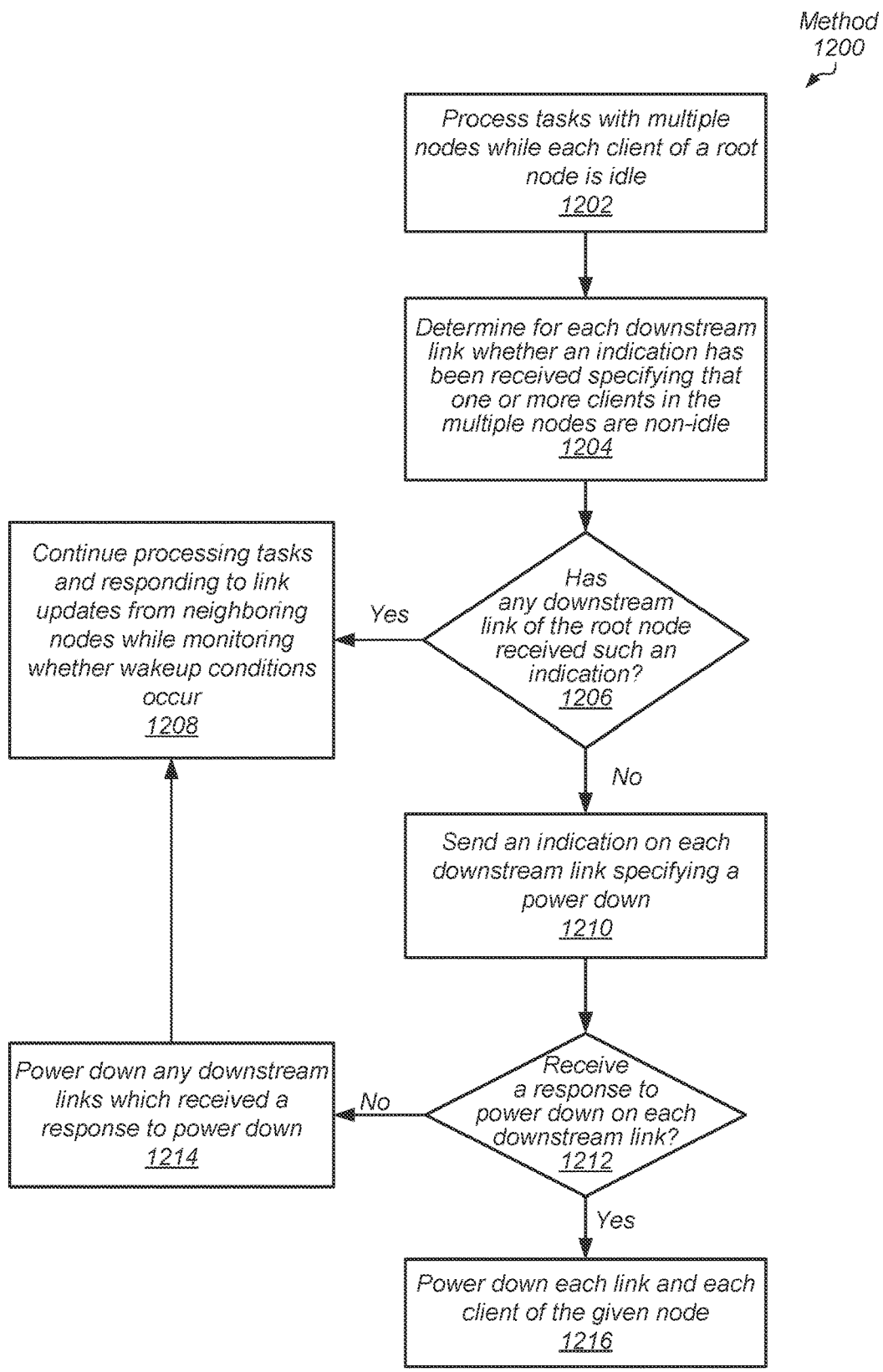
FIG. 12 is a flow diagram of another embodiment of a method for performing power management for a multi-node computing system.

Referring now to FIG. 12, another embodiment of a method 1200 for performing power management for a multi-node computing system is shown. Multiple nodes process tasks while each client of the root node is idle (block 1202). For each downstream link it is determined whether an indication has been received specifying that one or more clients in the multiple nodes are non-idle (block 1204). If any downstream link of the root node has received such an indication ("yes" branch of the conditional block 1206), then the multiple nodes continue processing tasks and responding to link updates from neighboring nodes while monitoring whether wakeup conditions occur (block 1208).

If no downstream link of the root node has received such an indication in responses ("no" branch of the conditional block 1206), then a request is sent on each downstream link of the given node to power down (block 1210). If a response is not received to power down on each downstream link of the root node ("no" branch of the conditional block 1212), then any downstream links which received a response to power down is powered down (block 1214). Afterward, control flow of method 1200 moves to block 1208 where the multiple nodes continue processing tasks. If responses are received to power down on each downstream link of the root node ("yes" branch of the conditional block 1212), then each link and each client of the root node is powered down (block 1214). Other nodes also perform these steps. The system-wide power down occurs despite multiple nodes not being connected to one another. In various embodiments, powering down the given node includes one or more of disabling drivers for link interfaces, disabling clocks for clients and setting system memory to perform self-refresh when DRAM is used.

Similar to nodes in the distributed approach, in various embodiments, when a given node in the centralized approach receives a power down request on an upstream link, the given node determines if each of its clients is idle. If so, then the given node responds on the upstream link with a response indicating a power down. Afterward, the given node powers down the upstream link. In addition, the given node sends the power down request on the downstream link of the given node. If the given node receives a power down response on the downstream link, then the given node powers down the downstream link. If each of the upstream link and the downstream link of the given node has transferred both a power down request and a power down response, then the given node powers down each link. When each link has been powered down in the given node, the given node proceeds with powering down each client. In some embodiments, when the given node determines that at least one of its clients is non-idle, the given node responds to the power down request on the upstream link with an indication that the given node is not going to power down. Additionally, in an embodiment, the given node does not send any power down requests on the downstream link.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A first processing node comprising:
   at least one link coupled to a second processing node;
   one or more clients comprising circuitry configured to process tasks; and
   a power controller comprising circuitry;
   wherein responsive to receipt of an indication from the second processing node that each client in the second processing node is idle and each client in a third processing node is idle:
      the power controller is configured to power down the at least one link and the one or more clients, responsive to all of the one or more clients in the first processing node being idle;
      the first processing node is configured to convey a non-idle indication to the second processing node, responsive to fewer than all of the one or more clients of the first processing node being idle.

2. The first processing node as recited in claim 1, wherein the first processing node further comprises a plurality of links coupled to a plurality of processing nodes.

3. The first processing node as recited in claim 2, wherein each of the plurality of processing nodes is not fully connected.

4. The first processing node as recited in claim 2, wherein the power controller is further configured to power down the plurality of links and said one or more clients responsive to transferring on each of the plurality of links a power down request and a power down response.

5. The first processing node as recited in claim 2, wherein the power controller is further configured to receive a second indication from a fourth processing node of the plurality of processing nodes different than the second processing node and third processing node specifying that each client in the fourth processing node is idle.

6. The first processing node as recited in claim 5, wherein the second indication indicates that a subset of the plurality of processing nodes is idle.

7. The first processing node as recited in claim 6, wherein the subset of the plurality of processing nodes are not directly connected to the first processing node.

8. A method, comprising:
   processing tasks by circuitry of one or more clients of a first processing node, wherein the first processing node is coupled to a second processing node via at least one link;
   receiving a first indication from the second processing node that each client in the second processing node is idle and each client in a third processing node is idle;
   receiving a second indication that all of the one or more clients of the first processing node are idle;
   powering down, by a power controller of the first processing node, at least one link and one or more clients of the first processing node, based on the first indication and the second indication; and
   receiving a third indication from the second processing node that each client in the second processing node is idle and each client in the third processing node is idle; and
   receiving a fourth indication that fewer than all of the one or more clients of the first processing node are idle; and
   conveying a non-idle indication to the second processing node, based on the third indication and the fourth indication.

9. The method as recited in claim 8, further comprising transferring requests and responses by a plurality of links of the first processing node coupled to a plurality of processing nodes.

10. The method as recited in claim 9, wherein each of the first processing node and the plurality of processing nodes is not fully connected.

11. The method as recited in claim 9, further comprising powering down the plurality of links and the one or more clients of the first processing node, by the first processing node, responsive to the first processing node transferring on each of the plurality of links a power down request and a power down response.

12. The method as recited in claim 9, further comprising receiving, by the first processing node, a given indication from a fourth processing node of the plurality of processing nodes that indicates each client in the fourth processing node is idle.

13. The method as recited in claim 12, wherein the given indication indicates that a subset of the plurality of processing nodes is idle.

14. The method as recited in claim 13, wherein the subset of the plurality of processing nodes are not directly connected to the first processing node.

15. A computing system comprising:
    a first processing node comprising one or more clients and power control circuitry; and
    a second processing node; and
    a link coupled between the first processing node and the second processing node;
    wherein the second processing node is configured to convey a power down request to the first processing node, responsive to clients of the second processing node being idle and clients of a third processing node being idle;
    wherein responsive to the power down request, the first processing node is configured to:
        convey a non-idle indication to the second processing node, responsive to fewer than all clients of the first processing node being idle; and
        power down, by the power control circuitry, the link and the one or more clients of the first processing node, responsive to all of the one or more clients in the first processing node being idle.

16. The computing system as recited in claim 15, wherein the first processing node further comprises a plurality of links coupled to a plurality of processing nodes.

17. The computing system as recited in claim 16, wherein responsive to the power down request, the first processing node is configured to convey a power down response to the second processing node, in response to all of the clients of the first processing node being idle.

18. The computing system as recited in claim 16, wherein the first processing node is further configured to power down the plurality of links and the clients of the first processing node responsive to the first processing node transferring on each of the plurality of links a power down request and a power down response.

19. The computing system as recited in claim 16, wherein the first processing node is further configured to receive a second indication from a fourth processing node of the plurality of processing nodes specifying that each client in the fourth processing node is idle.

20. The computing system as recited in claim 19, wherein the first processing node is further configured to receive an indication from the fourth processing node that indicates a plurality of processing nodes other than the fourth processing node are idle.

* * * * *